United States Patent [19]

Bonneau

[11] 4,433,751
[45] Feb. 28, 1984

[54] SOUND SUPPRESSOR LINER

[75] Inventor: Hilaire Bonneau, Boucherville, Canada

[73] Assignee: Pratt & Whitney Aircraft of Canada Limited, Longueuil, Canada

[21] Appl. No.: 329,008

[22] Filed: Dec. 9, 1981

[51] Int. Cl.³ .................................................. F01N 1/02
[52] U.S. Cl. .................................. 181/213; 181/224; 181/286; 181/288; 181/292
[58] Field of Search ............... 181/213, 250, 222, 224, 181/286, 288, 290, 292, 293, 269; 239/265.11; 60/264, 685, 687, 697; 428/116–118

[56] References Cited

U.S. PATENT DOCUMENTS

| 4,100,993 | 7/1978 | Feder | 181/213 |
|---|---|---|---|
| 4,106,587 | 8/1978 | Nash et al. | 181/213 |
| 4,137,992 | 2/1979 | Herman | 181/213 |
| 4,150,732 | 4/1979 | Hoch et al. | 181/213 |

Primary Examiner—Benjamin R. Fuller
Attorney, Agent, or Firm—Fleit, Jacobson, Cohn & Price

[57] ABSTRACT

A sound suppressor liner for aircraft exhaust passages is described which is based on the Helmholtz resonator principle including an inlet passage leading into a closed cavity wherein the inlet passages defined by a pair of curved walls with one wall being concave and the other wall being convex and the space between the walls gradually diminishing from the inlet of the inlet passage to the outlet within the cavity in a sense simulating an acoustic horn in reverse.

5 Claims, 6 Drawing Figures

SOUND SUPPRESSOR LINER

BACKGROUND OF THE INVENTION

1. Field of the Invention

The present invention relates to sound absorbing liners, and particularly to acoustic linings for gas turbine engines for absorbing noises in the low and midrange frequencies.

2. Description of the Prior Art

Some conventional absorption liners presently utilized in gas turbine exhaust ducts are based on the Helmholtz resonator principle. Examples of such applications are illustrated in U.S. Pat. No. 4,100,993, E. Feder, issued July 18, 1978, which illustrates a deep backing cavity with a narrow slotted opening with a straight depending lip forming an air column at the throat for increasing the mass reactance thereof. In U.S. Pat. No. 4,150,732, R. G. Hoch et al, issued Apr. 24, 1979, a further modification was suggested which includes a flange extending into the cavity from the depending throat-forming lip in order to form a bent duct within the cavity and thus increase the effective length of the inlet duct or inlet passage. If either the effective length of a Helmholtz resonator duct or the volume of the cavity is increased, the resonance frequency can be decreased as can be seen from the following relationship generally attributed to Helmholtz resonators.

$$fr \alpha \sqrt{\frac{S}{l' \cdot V}}$$

where fr is the resonance frequency, S is the cross-sectional area of the duct, l' is the effective length of the inlet duct, and V is the volume of the cavity.

However, in a turbine engine environment, large or deep cavities or vents are, of course, not practical, and thus different configurations such as described in the Hoch et al patent have been contemplated. As shown in the abovementioned patents, the suppressors form part of an acoustic liner within the housing of an engine such as in the exhaust duct of the engine. Thus, a usual configuration of such liners is of two concentric shells with the innermost shell being provided with openings such as slits and the cavity compartments being formed between the concentric shells.

SUMMARY OF THE INVENTION

It is an aim of the present invention to reduce the suppressor liner thickness, that is, the radial distance between the shells, while improving the attenuation of the sound propagated in the exhaust air duct. For instance, it is possible to provide a suppressor liner for an exhaust duct having a depth or radial thickness of 2 inches or less for absorbing a noise at a frequency of 350 $H_z$ and at a temperature of 1300° R., while a suppressor liner in accordance with the above mentioned patents would have a depth of approximately 4.5 inches.

A construction in accordance with the present invention comprises a sound suppressor liner having a first shell surrounding at least a portion of a gas flow path, suppressor cells on the first shell, each suppressor cell defining a cavity and an inlet passage opened towards said gas path and leading into and communicating with said cavity, said inlet passage being formed by at least a pair of curved walls with one wall being concave and the other being convex relative to the concave wall, and the space between the walls gradually diminishing from the inlet of the inlet passage to the outlet within the cavity and simulating an acoustic horn, and whereby the volume of the cavity and the dimensions of the inlet passage are chosen as a function of the bandwidth of noise frequencies it is desired to attenuate.

A more specific embodiment of the present invention comprises, in addition to the above-mentioned elements, a second shell spaced from the first shell and in contact with the gas path. The second shell includes a plurality of apertures communicating with the inlet passages.

In a specific embodiment of the present invention, a modular piece of sheet metal overlaps with adjacent modular pieces of sheet metal having similar configurations to form a battery of suppressor cells. A first section of the modular piece of sheet metal is bent to form a first concave curved surface relative to the gas path forming a wall of the inlet passage of a first attenuator cell, the apex of the first section being in contact with the first shell. A second section of the modular piece of sheet metal has a reverse curve relative to the first section and forming the cavity of a second cell adjacent the first cell. A third section of the modular piece of sheet metal forms a loop with the end thereof terminating midway of the second section and forming the other inlet passage wall in the second cell.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
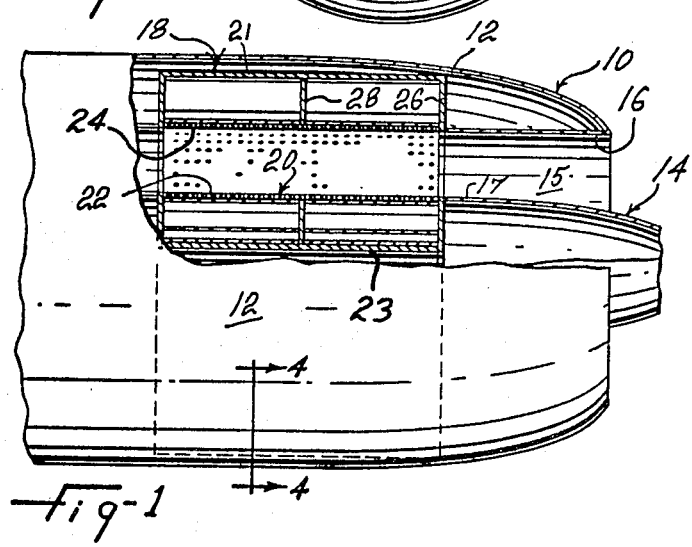
FIG. 1 is a side elevation, partly in cross-section, of an exhaust duct in a gas turbine engine incorporating the present invention.

A typical engine exhaust duct housing 10 is shown in FIG. 1 having an outer skin 12, a central core 14, and an annular duct wall 16 defining a gas path 15. A portion of the exhaust duct 10 includes an annular sound suppressor liner 18 having an outer closed shell 21 and an inner perforated shell 24 surrounding the gas path 15, and an annular sound suppressor liner 20 having an inner closed shell 23 and an outer perforated shell 22 built into the central core such that the outer shell 22 of the liner 20 is flush with the outer wall 17 of the core 14. Similarly, the inner shell 24 of the liner 18 is flush with the wall 16 defining the exhaust duct or gas path 15. The locations of the outer shell 21 of liner 18 and the inner shell 23 of liner 20 are determined by either the space available or the frequency of the sound to be absorbed. The liners 18 and 20 have a peculiar configuration compared with conventional straight line sound suppressors of the type described in the abovementioned patents.

The liner 20 is the same as liner 18 in configuration and, therefore, only liner 18 will be described.

Figure 3:
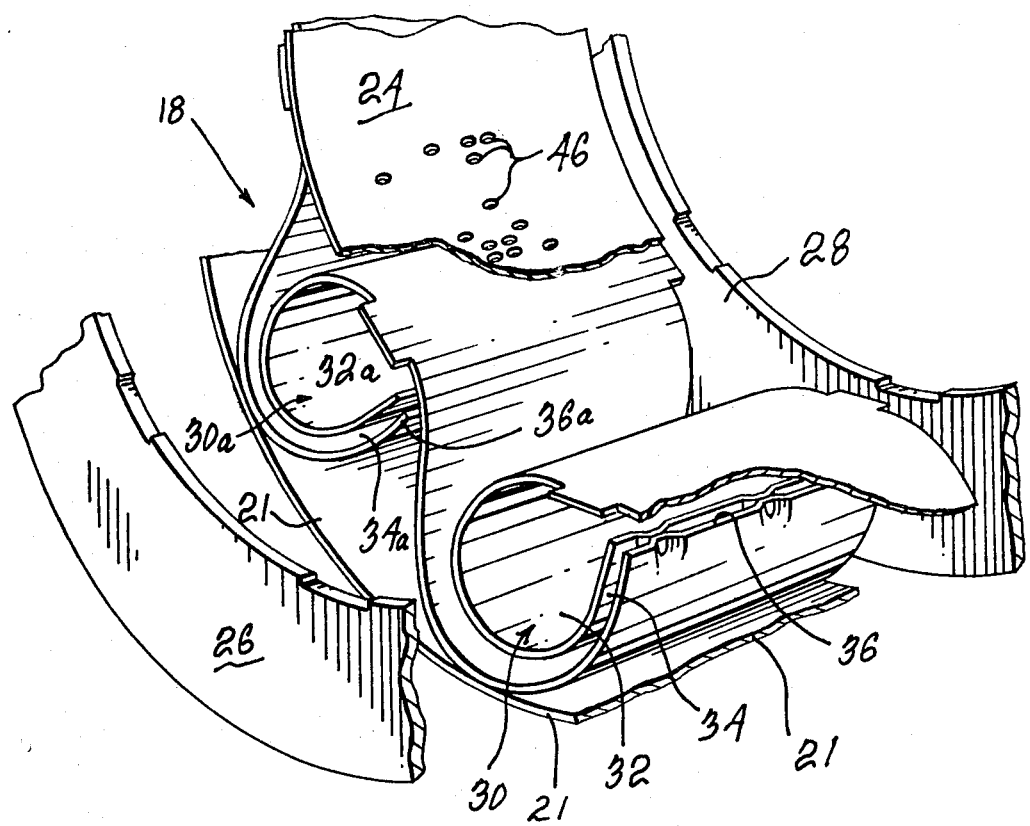
FIG. 3 is an enlarged fragmentary perspective view of a detail of the present invention.
Figure 4:
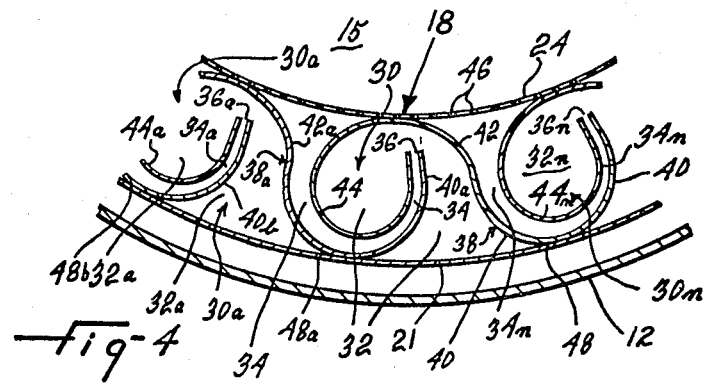
FIG. 4 is a cross-section taken along the line 4—4 of FIG. 1.

Referring to FIGS. 3 and 4, the liner 18 includes an outer closed shell 21, and partitions 26 and 28 dividing the annular liner 18 longitudinally into several compartments the numbers of which depends on the length of the liner. Each compartment is the same and contains a battery of cells 30, 30a, 30n. Since each of the batteries is the same, only the battery of cells shown between partitions 26 and 28 will be described. Since each cell 30, 30a, ... 30n in a battery is identical, only cell 30 will be described. In the drawings, the identical elements in cells 30a, ... 30n will be referred to with the same number raised by a corresponding subscript, i.e., 32a, .. . 32n. Each battery has a plurality of cells 30 which are adjacent laterally, or in this case, in the circumferential direction. Bascially, the configuration of each cell 30 includes a cavity 32 and an inlet passage 34 which conforms theoretically to a Helmholtz resonator. In the present configuration, the inlet passage 34 is in a form simulating an acoustic horn with the tapered or narrow outlet end 36 of the inlet passage being within the cavity 32. A special modular sheet metal member enables a simple fabrication of the cells 30 forming an annular battery. A typical sheet metal piece 38 includes three sections: a first section 40 which is concave in curvature relative to the duct or gas path 15 and forms the exterior wall of the inlet passage 34n of the adjacent cell 30n;

A second section 42 of the member 38 is curved convexly relative to the gas path and defines the cavity 32 of the cell 30, and a third section 44 is curved in a loop so as to form the interior wall of the inlet passage 34.

The cavity 32 is, in fact, formed between the second section 42 of the sheet metal member and the portion of the first shell 21 between the apex 48 contacting the shell 21 and the apex 48a as well as the area within the loop formed by the third section 44. The length of the inlet passage 34 extends from the shell 24 to the outlet 36. The sheet metal member 38, as shown in FIG. 4, has a peculiar curved shape which can be slightly modified to change the actual characteristics of each cell, thereby increasing the bandwidth absorption of the attenuator cells.

Figure 6:
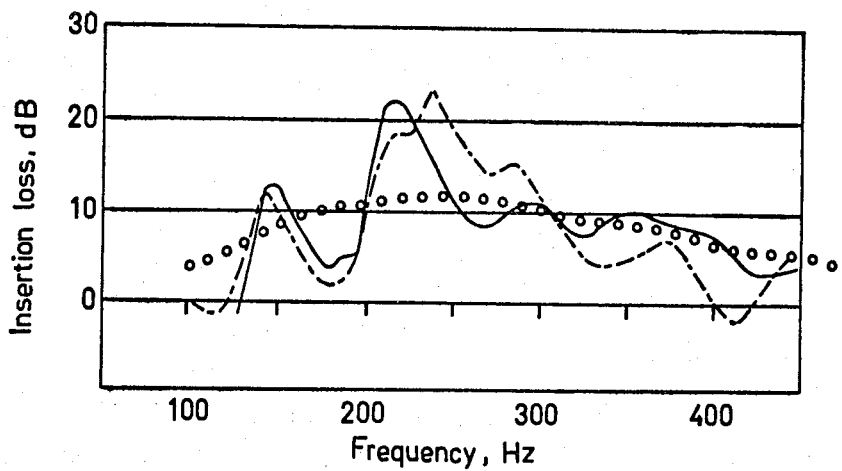
FIG. 6 is a chart in which two experimental performances of a suppressor liner of the present invention have been plotted compared to a conventional suppressor liner.

As seen in FIG. 6, the peak insertion loss for a particular cell with given dimensions has a very narrow bandwidth. However, by varying the characteristics dimensionally of the adjacent cells, an effective wider bandwidth suppression can be attained.

The inner shell 24 is provided with a plurality of openings or perforations 46 provided to complete the liner. The shell can be made as a perforated metal sheet or a fiber or porous metal sheet.

Figure 5:
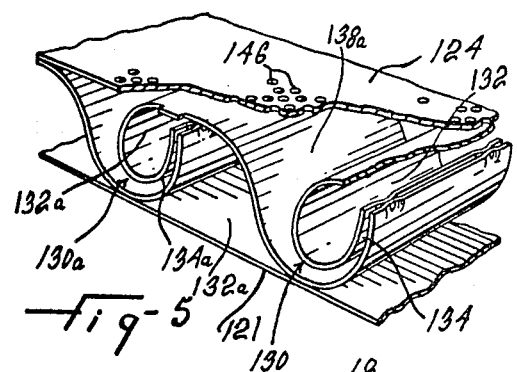
FIG. 5 is a view similar to FIG. 3 but showing a different embodiment thereof.
Figure 2:
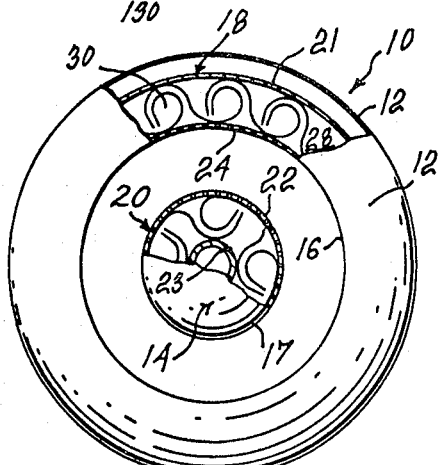
FIG. 2 is an end elevation of the exhaust duct shown in FIG. 1.

FIG. 5 shows an embodiment of the present invention which is similar to that already described, although the numerals have been raised by 100. In this case, the shells 121 and 124 are flat planes and, of course, the curved members 38 forming the various cells have less of a bend therein. The embodiment shown in FIG. 5 could be used for treatment of rectangular ducts or for acoustic baffles in a test room for engines, etc.

It is well known that for conventional Helmholtz resonators, the resonance frequency in terms of attenuator dimensions is:

$$fr = \frac{c}{2\pi} \sqrt{\frac{S}{l'V}}$$

where c is the speed of sound (ft/sec), $l'$ is the effective inlet passage length (ft), S is the cross-section of the area of the inlet passage (ft$^2$) and V (ft$^3$) is the volume of the cavity.

For the complex attenuator shape of the present invention, it was found that the correlation between resonance frequency and cavity volume agreed very well with the classical theory, i.e.:

$$fr \alpha \frac{1}{\sqrt{V}}$$

The remaining two parameters, the intake passage length and intake passage area did not obey the classical theory. From the experimental data of configurations tested, it was found that the dependence on S was lessened while that of $l'$ was increased according to the following relationship:

$$fr \alpha \frac{S^{.073}}{l'^{1.16}}$$

The attenuator suppression performance is compared in FIG. 6 to that of conventional bulk type suppressor liners for the same effective treatment dimensions, i.e., for an equal liner compartment length/effective inlet passage width ratio. It has been found that an experimental attenuator provided an overall attenuation about equivalent to that of convention liners. Its effectiveness over the desired frequency band is better by a factor of 1.5 to 2.5, but it is obtained at the expense of bandwidth reduction. It is more frequency sensitive than conventional liners, and it is thus more naturally suited for applications dominated by discrete frequencies. On the other hand, the effective bandwidth can be widened by combining, in a given suppression system, attenuator cells of varying dimensions.

The depth of the cavity is an important factor in most suppressor applications. The tested suppressor liner models were 3" and 5" thick and tuned at 240 H$_z$ and 175 H$_z$ respectively. Conventional liners, either of bulk or hollow cavity types, (single degree of freedom) would require thicknesses ranging between 14" to 20", to peak at the same frequencies. The suppressor of the present invention would thus offer a saving in the suppressor bulk or size requirements, of 4 to 5 times.

Broader band attenuation can be achieved by utilizing several different configurations. When one configuration is used, high attenuation (20-30 dB) occurs over a narrow bandwidth, as shown in FIG. 6. However, if several different configurations are used together in series along the exhaust duct, the high resonant peaks can be spread over a greater bandwidth, achieving broadband attenuation.

It has also been found that the attenuator of the present invention is best at low frequencies. The experimental attenuator featured a basic resonance frequency peak in the range of 150-200 H$_z$ at which the absorption coefficient approached 100%. In the high frequency range, above 800 H$_z$, multiple attenuation peaks were generated by the long effective length of the inlet passages. These peaks would not occur in conventional suppressors.

It is preferable to have the shell 24 perforated as opposed to having the inlet passages opened directly to the gas passage since the discontinuities created in the duct by the intake passages would generate turbulence, causing unwanted noise. The shell 24 maintains smooth air flow. In addition, it has been found in experimental work that the shell will have its own acoustic resistance which, when coupled with the inlet passage, will broaden the bandwidth of the absorptive spectrum. In previous experiments, a perforated shell 24 having 13% open perforations was found to produce maximum attenuation at 36 meters per second flow velocity. However, the optimum perforation ratio varies with each application conditions and needs to be optimized in each case. A practical range of perforation ratio might be from 13% to 23%.

In FIG. 6, measured attenuation was for an air flow velocity of 20 m/sec. The dotted line curve represents the attenuation performance with the shell 24 having 13% open perforations, and the full line curve represents the attenuation with the shell 24 being made of fiber metal with a flow resistance of 35 Rayls. The curve made up of small circles represents a conventional suppressor of the same effective length, but of 4.5 times the depth.

I claim:

1. A suppressor liner comprising a first shell and a second shell spaced from the first shell with the second shell being permeable to sound and in contact with a gas path, sheet metal members forming a plurality of attenuator cells, each cell defining a cavity and having inlet passage means therein and constituting a battery of cells between the first shell and the second shell, the adjacent cells in the battery being formed by similarly formed sheet metal members with each member having a first concavely curved section relative to the second shell and forming a wall of the inlet passage of a first cell, a second continuing convexly curved section relative to the gas path and forming a portion of the cavity of a second cell with the first shell, an inwardly looped third section forming the convex wall of the inlet passage of the second cell such that each sheet metal member overlaps an adjacent member to form subsequent cells.

2. A sound suppressor liner adjacent a gas flow path, the liner including a first closed shell, a plurality of attenuator cells formed adjacent the first shell, each attenuator cell having wall means defining a cavity with the first shell and an inlet passage communicating at an inlet end with said gas flow path and leading into and communicating with said cavity, said wall means defining said inlet passage including at least a pair of curved walls with one wall being concave and the other being convex relative to the concave wall, with the space between the walls gradually diminishing from the inlet of the inlet passage towards the cavity, such that the curved walls simulate an acoustic horn, the volume of the cavity and the dimensions of the inlet passage are chosen as a function of the bandwidth of noise frequencies it is desired to attenuate.

3. A sound suppressor liner as defined in claim 2, wherein the liner includes a second shell which is permeable to sound and air and is in contact with the gas path and covers the inlets of the inlet passages of the attenuator cells.

4. A suppressor liner as defined in claim 3, wherein the second shell which is permeable to sound is made of fiber sheet material such as fibrous or porous metal.

5. A sound suppressor liner as defined in claim 3, wherein the second shell is a perforated sheet.

* * * * *